Figure 1:
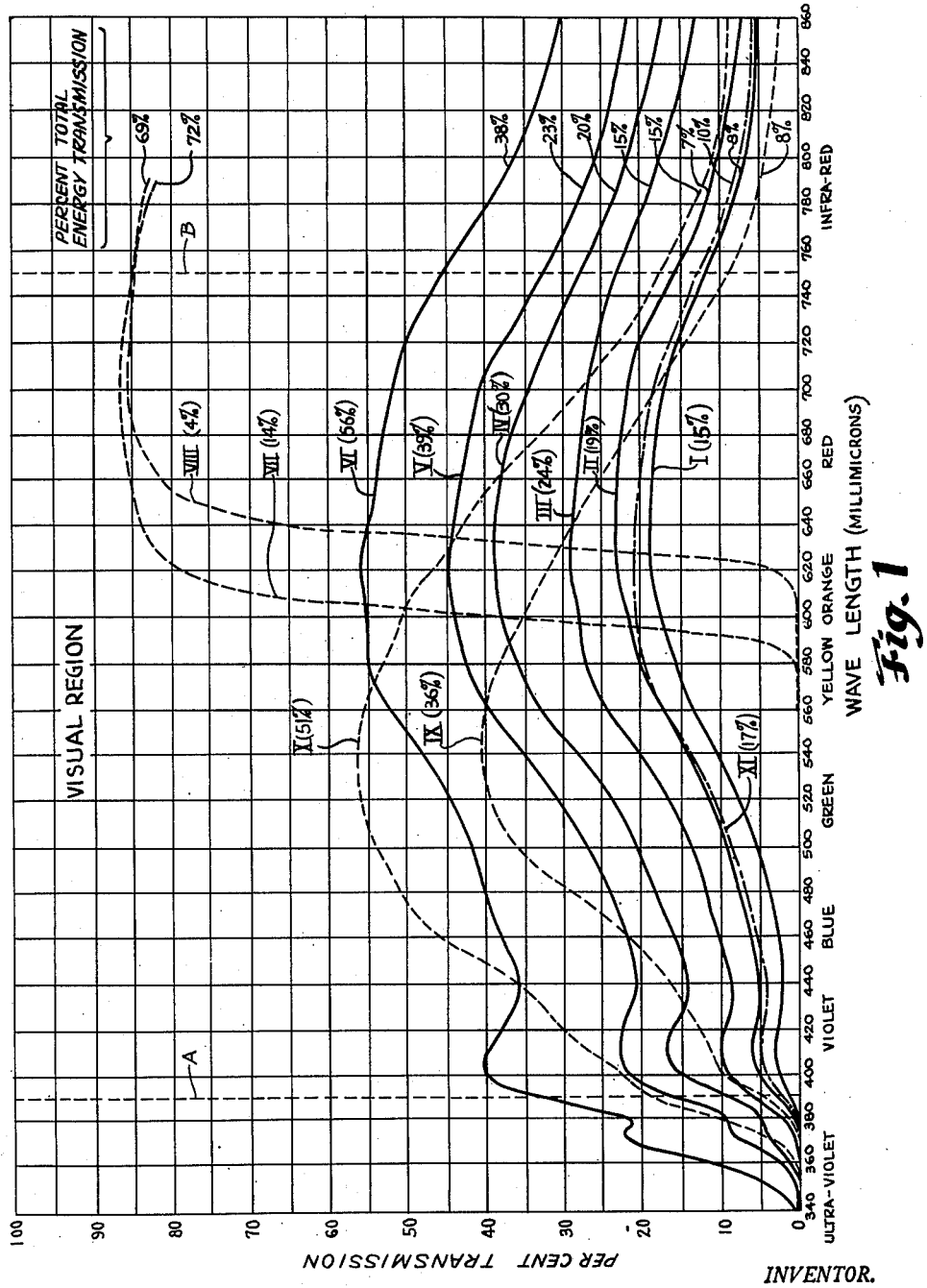

Oct. 3, 1950 E. D. TILLYER 2,524,719
GLASS COMPOSITION
Filed Nov. 26, 1946 2 Sheets-Sheet 1

INVENTOR.
Edgar D. Tillyer
BY
Louis L. Gagnon
ATTORNEY

Oct. 3, 1950  E. D. TILLYER  2,524,719
GLASS COMPOSITION

Filed Nov. 26, 1946  2 Sheets-Sheet 2

INVENTOR
Edgar D. Tillyer
BY
ATTORNEY

Patented Oct. 3, 1950

2,524,719

UNITED STATES PATENT OFFICE 2,524,719

GLASS COMPOSITION

Edgar D. Tillyer, Southbridge, Mass., assignor to American Optical Company, Southbridge, Mass., a voluntary association of Massachusetts Application November 26, 1946, Serial No. 712,367

7 Claims. (Cl. 106—52)

This invention relates to improvements in light absorbing glass and more particularly to improvements in infra-red and ultra-violet light absorbing glass for use in the manufacture of lenses, filters and similar light transmitting mediums. It also relates to an improved method of making such light absorbing glass.

This application is a continuation-in-part of my copending application, Serial No. 509,596, filed November 9, 1943, which was a continuation in part of my earlier filed application, Serial No. 357,626, filed September 20, 1940, both now abandoned.

Heretofore, the most commonly used infra-red and ultra-violet absorbing glasses, such as might be employed as lenses for sunglasses and the like, have had incorporated therein various amounts of iron for producing such absorption characteristics, and the different optical densities required were obtained by varying the amount of iron incorporated in the resultant glass. The ferric-ferrous relationship of such iron in the finished glass furthermore had a direct and material bearing on the color and the absorptive characteristics of the glass, for in such an iron containing glass of a given composition if the ferrous iron content thereof were increased (at the expense of the ferric iron content thereof) a much desired increase in the infra-red absorption characteristics of the glass could be produced without necessitating the addition of more iron for producing such increase, and thus without materially changing the total visual transmission of such glass. This manner of providing a high infra-red absorbing glass, however, resulted in a cold shade or color. The shade of such known iron containing infra-red absorbing glass inherently came within a range of colors varying from a blue-green to a yellow-green, with the colder colors (that is the ones with relatively higher transmission in the blue end of the spectrum) giving the best infra-red absorption characteristics. In order to obtain greater infra-red absorption in a glass without a sacrifice in its visual transmission it was necessary to accept such colder blue-green shades or color. On the other hand, a warmer shade or color (a shade or color with higher transmission in the red end of the spectrum) was for various reasons, to be mentioned later, much more desirable.

Applicant has found that the addition of selenium either in metallic form or in combined form and with additional selected coloring ingredients of controlled proportions may be incorporated into an iron containing glass to produce excellent infra-red and ultra-violet absorbing characteristics which are noticeably similar to those obtainable by the best-known commercial iron containing glasses, and at the same time produce controlled transmission properties resulting in warm rose smoke shades or colors of controlled density.

It is, accordingly, one of the principal objects of the present invention to provide an improved absorbing glass for use in the manufacture of light transmitting mediums, filters, eye protective and other types of lenses and the like containing iron in controlled amounts and controlled form for producing desirable infra-red and ultra-violet absorption characteristics in the resultant glass and, additionally, means for simultaneously providing an improved control of the visible light transmission characteristics of the glass. The invention also includes glass batches for obtaining the above mentioned glass and the method for producing such improved absorbing glass.

An additional object of the invention is to provide a light absorbing glass having the above mentioned infra-red and ultra-violet absorbing characteristics, having improved optical or visual definition while providing a better control of the visible light transmission so as to transmit mostly in regions toward the red end of the spectrum for giving a warm rose smoke shade or color to objects viewed through such resultant glass, said glass allowing a limited transmission in the blue and green for certain ophthalmic purposes to be subsequently described. By a warm rose smoke shade or color as used throughout the specification and claims, I mean a shade or color approximating that which might be provided when objects are viewed through a bluish red to yellowish red transparent medium combined with a neutral or greyish transparent medium of various densities and with red predominating sufficiently to provide a warmth to said color. The invention also includes a method and formulas for producing such an improved infra-red and ultra-violet absorbing glass having good visual definition and rose smoke shade or color.

Another object of the invention is to provide a glass of the character described having a spectro-photometric transmission curve characterized by a relatively high transmission in the yellow-orange to red region, gradually decreasing and having low but some transmission in the blue region and having a controlled low transmission in the ultra-violet and infra-red regions.

It is an additional object of the invention to provide an improved infra-red and ultra-violet absorbing glass comprising iron and selenium in controlled amounts and controlled form for providing a warm rose smoke shade or color to objects viewed therethrough. The invention also includes the glass batches for obtaining this improved glass as well as the method of producing same.

A further object of the invention is to provide improved light absorbing glass and an improved method of making same, said glass having a rose smoke color or shade, good optical and visual definition, a controlled amount of visual transmission and a total energy transmission which is controlled so as to be lower than the visual.

Other advantages and objects of the invention will become apparent from the detailed description which follows taken in conjunction with the accompanying drawing. It will be apparent that many changes may be made in the details of construction and in the steps of the method disclosed without departing from the spirit of the invention as set forth in the accompanying claims. It is, therefore, not desired that the invention be limited to the exact details of the means and method disclosed as such have been given by way of illustration only.

Figure 2:
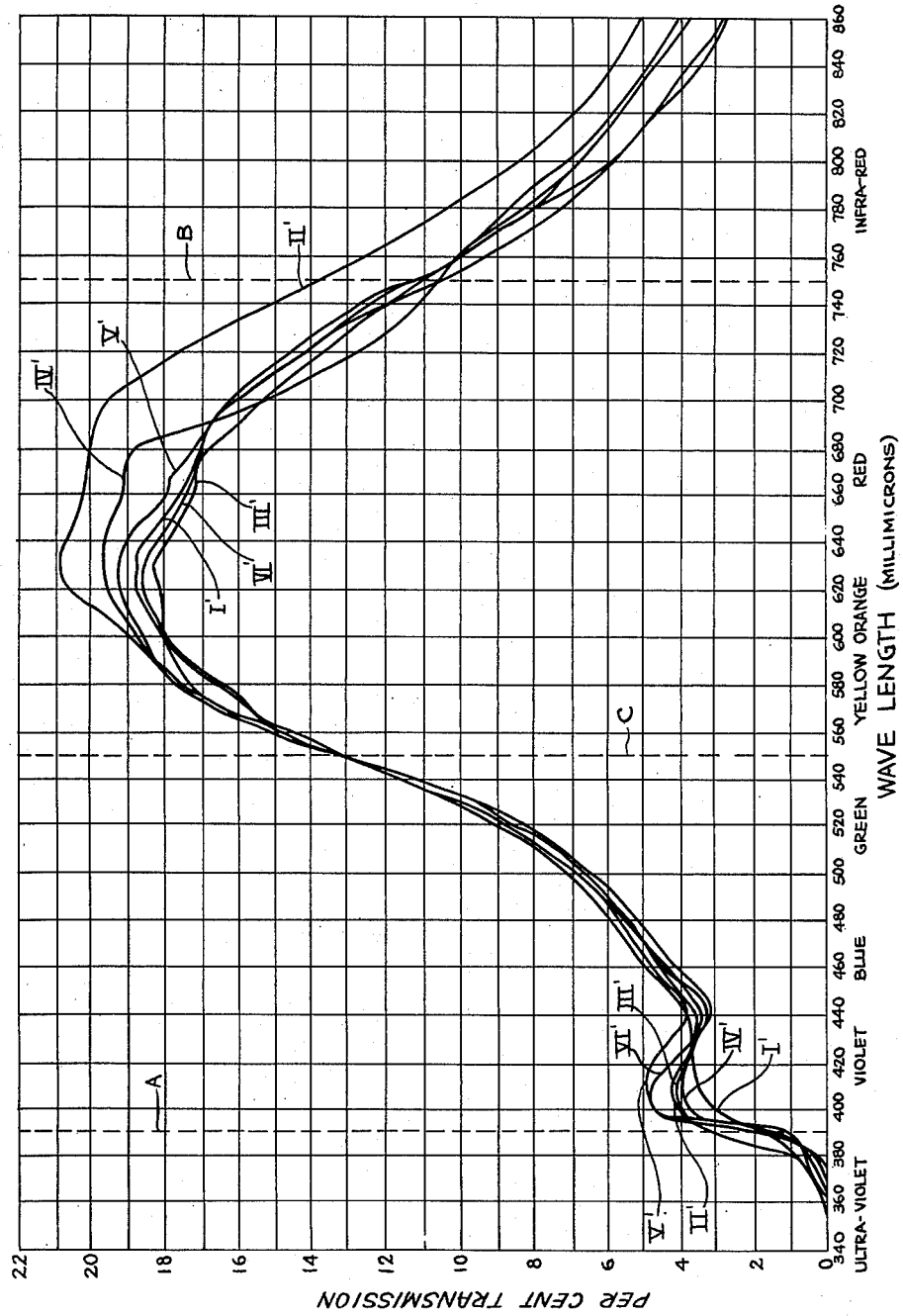

A more thorough understanding of the invention may be had from the detailed description which follows when considered together with the accompanying drawings in which:

Fig. 1 is a chart or graph showing light transmission curves of certain preferred types of glass made in accordance with the present invention as well as the transmission curves of certain well-known commercial iron containing glasses and certain well-known commercial selenium containing glasses; and Fig. 2 is a chart or graph of the light transmission characteristics of the preferred types of glass translated to a common percentage transmission at 550 millimicrons for comparison purposes.

The use of absorbing glasses containing iron for reducing infra-red and ultra-violet radiation, such as is present in bright sunlight, has developed to important proportions particularly in the ophthalmic arts. Difficulties, however, have been encountered in the past in obtaining an infra-red absorbing silicate glass having a desirable controlled transmission in the visible range and having a maximum visual transmission more toward the red end of the spectrum than the inherent blue-green to yellow-green of the well-known forms of commercial iron containing absorbing glasses.

One desirable advantage of the improved glass with higher transmission toward the red end of the spectrum is that it affords better haze penetration while still allowing a sufficient transmission in the blue and green to allow distinguishing between objects of low contrast. It has been found, furthermore, through actual use that glasses of the above nature possess a combination of desirable characteristics heretofore not obtainable in any single piece of glass, namely: a relatively high transmission in the red region of the spectrum, which has a pleasing and relaxing physiological and psychological effect on one looking through said glass or lens; a relatively low but definite transmission in the blue, whereby penetration of haze and delineation is increased (because normally haze scatters the blue light); the transmission in the blue being of a small amount but sufficient to act as a stimulus to the normal functioning of the eye, this small amount of blue presumably stimulating the eye and thus maintaining an adequate supply of blood to the retina; possessing ultra-violet absorption properties, so that the ultra-violet is absorbed very nearly completely, because same is not needed for vision and exposure to ultra-violet can cause conjunctivitis and is known to retard subsequent dark adaptation as well as to introduce other undesirable effects; possessing infra-red absorption to such an extent that there is appreciably less infra-red than the visible ray transmission, because decrease in the visual region causes greater dilation of the pupil thereby rendering the eye more vulnerable to infra-red and thus the amount of infra-red should also be reduced and maintained less than that of the visible in order to prevent excess infra-red radiation entering the eye; and providing a more desirable over-all color impression. The above improved glass, therefore, possesses a combination of highly desirable features heretofore not obtainable in a single piece of glass or glass composition.

While selenium has long been used for several different purposes in the glass industry, such uses and the glass resulting from such uses of selenium differ widely from the method and the glass disclosed by the present invention. Selenium has been used previously in the production of colored glass having a very high transmission in the orange and red portions of the spectrum and none in the blue and green regions. Such glass has also a very high transmission in the infra-red. This glass would not be desirable for the intended uses of the present invention. Selenium has also been used, heretofore, as a bleaching or decolorizing agent in the production of certain types of clear substantially iron-free glasses. Selenium has even been used in small quantities as a fining agent in the production of heat absorbing glass. However, each of such prior uses of selenium in glass was for entirely different purposes and would not produce a glass having the desirable infra-red and ultra-violet absorbing characteristics, as well as the desired visual and total energy transmission characteristics, mentioned above.

Applicant's invention, however, has overcome such difficulties and objections of the prior art types of selenium containing glasses on the one hand and of iron containing glasses on the other hand by producing a glass containing both iron and selenium with or without additional selected coloring ingredients of controlled proportions and affording a warm rose smoke shade or color and improved visual definition while also providing the high infra-red and ultra-violet absorbing characteristics desired. The transmission properties of the glass of the present invention are such as to be very low in the ultra-violet, relatively low toward the blue end of the spectrum and relatively high toward the red end of the spectrum, and providing a relatively low total transmission in the infra-red. The transmission in the visible range is controlled so as to be relatively low in the violet and blue while intentionally retaining some transmission thereof, somewhat higher in the green and a maximum in the yellow, orange and red, dropping off appreciably as the infra-red region is entered. Such characteristics cause the resultant glass to have a relatively low total energy transmission, a controlled low but appreciable transmission in the blue, a relatively higher transmission in the green, a desired high transmission in the yellow, orange and red and a relatively high total absorption in the infra-red. These glasses, particularly of the types designated I, II, III, IV, V and VI, when used for sunglasses transmit a rose smoke shade or color as well as provide a more pleasing appearance when used as lenses on the face of the wearer than did the infra-red absorbing iron containing sunglasses of former composition.

Lenses or the like of the present absorbing glass may be of various shapes, may be flat or curved on one or both faces as desired and may be of no power or of any desired optical power prescribed. The surfaces of the lenses, filters and the like may be ground and polished as is usual in the lens making art, or such mediums may be produced by any other well-known glass fabricating methods.

Referring to Fig. 1 of the drawing in detail it will be seen that the numerals I, II, III, IV, V and VI indicate by solid lines the transmission curves of six different pieces of glass embodying the present invention. Wave lengths in millimicrons ranging from 340 to 860 are given in the horizontal direction of the chart or graph and percentage transmissions from 0 to 100% are indicated in the vertical direction. Fig. 1 is thus arranged to show the entire visible range which normally extends from approximately 390, indicated by the vertical dotted line A, to approximately 750, indicated by the vertical dotted line B. It will be seen that the greatest visual transmissions for these curves occur toward the red end of the spectrum (as distinguished from the opposite or blue end) and the maximum region is between approximately 560 and 730. This maximum region thus comprehends most of the yellow, orange and red. Proceeding towards the left of Fig. 1, it will be seen that these curves decrease gradually as the green, blue-green and blue are approached and after a slight rise of each in the violet a relatively sharp decline occurs as the ultra-violet is entered. Proceeding in the other direction from the region of maximum visual transmission, it will be seen that these curves descend rather rapidly as the infra-red region is entered. In the infra-red region, the transmission characteristics are noticeably similar to the absorption characteristics obtained by the above-mentioned well-known iron-containing glasses. The total energy transmission for these glasses is given hereinafter.

Inspection of the transmission curves I, II, III, IV, V and VI readily shows that these glasses are of progressively lesser optical densities. The thickness of each of the glasses producing these curves is approximately 2 millimeters, a thickness commonly used in measuring absorptive glasses, lenses and the like. In order that the basic curve characteristics of these glasses may be more readily observed, a group of six transmission curves I', II', III', IV', V' and VI' are given in Fig. 2. These latter curves are derived by computing for each of the glasses producing curves I to VI the thicknesses, respectively, which will provide a transmission of 12.9% at 550 millimicrons. (This wave length, indicated by dotted line C, is selected because it falls approximately at the maximum point on the visual sensitivity curve.) Then for each glass, taking the thickness so derived and its transmission from Fig. 1, the complete transmission curve is computed. This gives the same results as though a blank of each of these glasses were carefully ground and polished to the computed thicknesses and then their respective transmissions measured. The computed thicknesses for curves I' to VI' are approximately 2.0, 2.1, 2.8, 3.6, 4.3 and 6.0, respectively. Throughout the entire visual range of these six curves of Fig. 2 it will be noted that they follow a generally similar and relatively narrow path. At 460 millimicrons (blue), for example, all lie between 4 and 5 per cent, at 520 all lie between 8 and 9+ per cent, at 590 (sodium yellow) all lie between 17 and 18.5 per cent, at 625 all lie between 18 and 21 per cent, at 680 all lie between 16.5 and 20.5 per cent and at 720 all lie between 12 and 18 per cent.

It will be obvious from inspection of these curves I' to VI' that slightly varying conditions of composition, fabrication or the like, might, throughout the visual range, cause slight deviations somewhat above or before the percentage values shown by Fig. 2 and still these curves would follow generally the general course or path disclosed. Deviations of as much as 1 per cent from the curves disclosed in regions below 500 millimicrons and of as much as 2 per cent in regions above 600 millimicrons might result from such varying conditions without departing materially from the basic curve characteristics and such are believed to be within the scope of the invention. Obviously the deviations would be proportionally less from 500 toward the common point at 550 and between 550 and 600 would gradually increase. All of curves I' to VI' have their greatest transmission in yellow, orange and red region, a lower but appreciable transmission in the blue and blue-green and a relatively high absorption in the infra-red and ultra-violet. The transmission at every successive wave length longer than 440 millimicrons increases uninterruptedly until approximately 600 millimicrons is reached. This fundamental curve, however, can be modified slightly by the introduction of a coloring agent such as didymium which will give the characteristic didymium absorption band at approximately 580 millimicrons.

Curves VII and VIII, shown by dotted lines in Fig. 1, are presented to show the visual transmission characteristics of two well-known forms of commercially available selenium glass and it will be readily apparent when compared with curves I to VI that such glasses possess none of the desirable characteristics obtained by applicant's invention. Each has a very high transmission in the red and the infra-red and no transmission in the green or toward the blue end of the spectrum. On the other hand, the dotted curves IX and X are given to show the transmission characteristics of two well-known forms of iron-containing glass having high infra-red absorbing characteristics. While the transmission curves of these latter iron-containing glasses are somewhat similar in shape to curves I to VI, it will be readily seen that they do not comprehend the same region. Each transmits in the visible mostly in the blue, blue-green, and green and appreciably less in the yellow, orange and red. The glasses of curves IX and X obviously possess different characteristics than those of the present invention.

As illustrative of the approximate glass batch compositions which will produce glasses having the transmission curves I to VI, the following table is given, the values appearing therein being parts by weight:

Table A

|  | I | II | III | IV | V | VI |
|---|---|---|---|---|---|---|
| Sand | 70.65 | 71.48 | 71.11 | 70.91 | 70.77 | 69.76 |
| Soda Ash | 25.8 | 12.7 | 25.8 | 25.4 | 25.8 | 13.4 |
| Potash |  | 13.4 |  |  |  | 13.2 |
| Limestone | 14.4 | 9.1 | 14.0 | 16.9 | 17.7 | 17.7 |
| Sodium Chloride | 1.0 | 1.0 | 1.0 | 1.0 | 1.0 | 1.0 |
| Sodium Sulphate | 1.0 | 0.8 | 1.0 | 1.0 | 1.0 | 0.8 |
| Rouge | 4.4 | 5.3 | 4.2 | 3.1 | 2.4 | 1.9 |
| Sodium Selenite | 0.24 | 0.11 | 0.13 | 0.09 | 0.03 | 0.03 |
| Cobaltic Oxide | 0.001 | 0.007 | 0.01 | 0.004 | 0.004 | 0.003 |

Carbon or equivalent reducing agent: 0.01 to 1.0 depending on amount of iron, size of batch, and specific furnace and melting conditions.

The chemical analyses of these batches when calculated would be approximately as follows:

Table B

|  | I | II | III | IV | V | VI |
|---|---|---|---|---|---|---|
| Silicon Dioxide | 70.65 | 71.48 | 71.11 | 70.91 | 70.77 | 69.76 |
| Sodium Oxide | 15.08 | 7.41 | 15.09 | 14.21 | 15.05 | 7.83 |
| Potassium Oxide |  | 9.11 |  |  |  | 8.98 |
| Calcium Oxide | 8.08 | 5.11 | 7.83 | 9.48 | 10.04 | 10.02 |
| Sodium Chloride | 0.85 | 0.86 | 0.85 | 0.89 | 0.85 | 0.85 |
| Sodium Sulphate | 0.85 | 0.71 | 0.85 | 0.91 | 0.85 | 0.70 |
| Iron Oxides | 4.38 | 5.27 | 4.20 | 3.10 | 2.40 | 1.86 |
| Selenium | 0.11 | 0.05 | 0.06 | 0.04 | 0.014 | 0.014 |
| Cobalt Oxide | a trace | 0.007 | 0.01 | 0.004 | 0.004 | 0.003 |

Each prepared batch is preferably heated under reducing conditions or with suitable ingredients such as carbon, graphite, silicon carbide, oxalates or other reducing agents to give reducing conditions to the batch in order that a relatively high controlled ferrous iron content may be produced for providing high infra-red absorbing characteristics in the resultant glass. During the heating and processing of the glass, great care must be taken to avoid driving off of the selenium since this would fail to give the particular glass or glasses desired. While metallic selenium may be added as an ingredient in each or any of the above batches, best results have been obtained when the selenium has been added to the individual batch as a selenium salt, such as sodium selenite ($Na_2SeO_3$), or barium selenite ($BaSeO_3$) or iron selenide ($FeSe_2$), since it has been found possible in this way to use smaller quantities of selenium and more positively obtain the desired results. It is presumed that the selenium in the combined form is less volatile and thus there is less difficulty encountered in preventing the selenium from being boiled off or carried off by volatile gases or its value otherwise destroyed during the melting. Also greater difficulty in this respect will occur at times if the temperature of the glass batch during the processing is allowed to rise higher than necessary to properly melt the batch or maintained longer than necessary to fine the glass at such elevated temperatures or if the proper reducing balance is not maintained between the furnace atmosphere and the carbon or other reducing components of the batch. From the above it will be seen that it is not only necessary to maintain careful controls in order to introduce the proper infra-red absorption but also careful controls must be maintained to insure that the proper amount of selenium in the proper form remains in the resultant glass. For example, if the glass batch is such as to require a high temperature for melting, whereby more volatilization is apt to occur, the proportion of selenium added to the batch must be increased accordingly and vice versa. Where the batch is known to produce, because of oxidizing or other ingredients, excess gases during melting, more selenium will be carried off and therefore a much greater allowance must be made for this condition or if possible the gassing decreased. Melting furnaces with very high velocities of the burning gases will tend to carry off the selenium and controls in this respect must be maintained.

While the total amount of selenium added to the batch is small, it has a powerful effect when properly incorporated and retained in the resultant glass and produces, instead of the well-known inherently blue-green to yellow-green color of a conventional iron-containing infra-red absorbing glass, a glass having a warm rose smoke shade or color and noticeably similar infra-red and ultra-violet absorbing characteristics.

A comparison of the percentages of visual transmission and total energy transmission of the several glasses giving curves I to X may be obtained from the following table and are shown in the drawing. (By total energy as used herein, I mean the ratio of energies received on a thermocouple with the glass under test in the system compared with the energy without the glass under test in the system. The official system consists of a 200 watt gas filled Mazda lamp at normal voltage, a clear glass filter, non-selective thermocouples and reflecting galvanometer to measure the relative energies received by the thermocouples.)

Table C

|  | I | II | III | IV | V | VI | VII | VIII | IX | X |
|---|---|---|---|---|---|---|---|---|---|---|
|  | Percent | Percent | Percent | Percent | Percent | Percent | Percent | Percent | Percent | Percent |
| V. T. | 15 | 19 | 24 | 30 | 39 | 56 | 14 | 4 | 36 | 51 |
| T. E. T. | 8 | 7 | 15 | 20 | 23 | 38 | 72 | 69 | 8 | 15 |

While the total visual transmission for the glasses of VII and VIII are only 14 and 4 per cent, respectively, it should be noted that such is confined entirely to the yellow, orange and red portions of the spectrum and with a very high total energy transmission. There is no transmission in the green, blue or violet, and accordingly the selenium glasses producing these curves can not be considered as equivalents of applicant's improved glass. (The thickness of the glass producing curve VII is 3.30 millimeters, for curve VIII the glass is 3.60 millimeters.)

Actual chemical analysis of the resultant glass giving the transmission curve I is as follows:

Table D

| | Parts by weight |
|---|---|
| Silicon dioxide | 71.69 |
| Sodium oxide | 15.22 |
| Potassium oxide | 0.15 |
| Calcium oxide | 7.94 |
| Ferric oxide | 3.46 |
| Ferrous oxide | 0.87 |
| Selenium | 0.017 |
| Misc. ingredients | 0.73 |

While slight changes in the ingredients of the resultant glass from those computed from the original batch have occurred, due presumably largely to the melting conditions and type of furnace employed, it will be noted that a material change has taken place in the selenium thereof so that only a very small amount of the selenium is quantitatively distinguishable in an analysis of this resultant glass. This small amount, nevertheless, is readily distinguishable therein by commonly known methods of chemical analysis. The important factor, however, is that the desired absorption characteristics occur in the finished glass and an advantageous visual transmission and good visual definition are obtained. Also a relatively high ferrous iron content is produced to give good infra-red absorption without so affecting the selenium as to drive off too much of it or destroy the visual transmission characteristics which it confers.

It should be noted that the batch composition for producing the glass giving dot-dash curve XI is the same as the batch composition given in Table A for the glass producing curve I. Two different melts were made from the same batch compositions under slightly different reducing conditions and thus slightly different transmission characteristics were obtained in these resultant glasses as shown by curves I and XI. This further substantiates applicant's belief that the selenium content of the iron-containing glass of the present invention materially affects the transmission characteristics obtained and the melts are directly and vitally affected by small differences or variation in the processing conditions employed. While the visual transmissions of the glasses giving curves I and XI are 15% and 17% respectively, differing by 2%, it will be noted that the total energy transmissions of both are substantially the same.

An actual chemical analysis of the glass providing transmission curve VI is as follows:

*Table E*

| | Parts by weight |
|---|---|
| Silicon dioxide | 70.61 |
| Sodium oxide | 8.58 |
| Potassium oxide | 8.44 |
| Calcium oxide | 9.90 |
| Ferric oxide | 1.62 |
| Ferrous oxide | 0.288 |
| Selenium | 0.014 |
| Misc. ingredients | 0.164 |

Here again it appears that although the selenium content of the glass is very low, only about 14 thousandths of a per cent, desired results have been obtained. This glass differs somewhat from the glasses giving curves I and III, for example, by the inclusion of potassium oxide in place of some of the sodium oxide thereof, further showing that it is the iron, selenium and the control during the processing of the glass which are the critical factors affecting the spectral transmission obtained. The other ingredients may vary somewhat with satisfactory results and may extend as follows; for silicon dioxide from 65 to 75%, for sodium and potassium oxides combined from 11 to 19%, and for calcium and iron oxides together from 8 to 16%, with the iron oxide thereof ranging normally from 1½ to 5½%, and selenium from a thousandth to 0.2%.

The glass batch formulas given above are for crown glasses of the soda lime silicate and soda potash lime silicate types which are the glasses of the preferred types to be used. However, applicant's invention may be applied to various other well-known types of glasses, such as flint, barium, etc., glasses and also other alkali metal oxides substituted in part for the soda or potash may be used.

It is possible, as stated previously in the discussion of the curves of Fig. 2, to vary the ingredients and proportions of the batch formulas by controlled amounts according to the particular results desired. The important considerations are that the glass remains an iron-containing glass with a relatively high ferrous iron content and that the selenium be retained in proper amounts and form in the finished glass. The high ferrous iron content may be obtained in many ways such as by the use of such reducing agents as carbon, graphite, silicon, carbide, oxalates, by reducing gases in the furnace, or in any other way well-known in the art. In glasses made in accordance with the present invention the iron content in the resultant glass may be varied ordinarily from approximately 1½% to 5½% (or even as high as 12 or 13% in special cases such as in welding glass and the like, wherein the visual transmission may be as low as a small fraction of one percent) depending upon the density desired in the glass. The selenium in the batch may vary greatly and may lie between substantially 1/100th of 1% to 3 or more per cent by weight of the batch, the amount employed depending greatly upon the melting conditions, the size of glass pot, furnace conditions and the density desired in the resulting selenium-iron-containing glass. The selenium content of such resultant glass has so far been found, by actual chemical analysis, to be of the order of one to two hundredths of a per cent when the glass is being produced for the ordinary shades or densities and in large quantities under commercial fabricating methods. It is not known what proportion of the selenium found by analysis exists in the glass in the state of oxidation and complex structural condition, actually bringing about the desired transmission and color characteristics, but it is definitely known that careful control must be exercised over the oxidation, reduction, melting cycle and other conditions affecting the transmission characteristics desired. In the denser special shades wherein the iron content is relatively higher the selenium content will be somewhat greater. The important factor appears to be that a small amount of selenium in the proper form and proportion be retained in the resultant glass to give the visual and total energy transmissions desired as well as a desired warm rose smoke shade or color and high absorption in the infra-red and ultra-violet regions.

In cases where it is desired to alter somewhat the warmth or shade of any of the glasses of curves I to VI this may be accomplished by the inclusion of carefully controlled amounts of coloring ingredients such as cobalt, nickel, didymium or rare earth oxides.

It is interesting to note that many ferrous iron infra-red absorbing glasses contain cerium for the purpose of providing ultra-violet absorption and may be used in some of the present glasses, particularly in the lighter shades. Sufficient ultra-violet absorption may usually be obtained in the glass of the present invention by the addition of selenium to the iron-containing batch and the proper control thereof during melting and without requiring the use of cerium in the batch for such purposes. It may be desirous, however, that cerium be present in certain of such batches and such is permissible without injurious effects thereto. While cerium oxide has been omitted from the examples given above, it may at times be found advantageous to include cerium oxide in either the pure or crude commercial forms in order to assist fining of the glass melt and to obtain a better balance between the ultra-violet, infra-red and color characteristics of the resultant glass desired. The chemical analysis of such a glass batch containing cerium is as follows:

Table F

| | Parts by weight |
|---|---|
| Silicon dioxide | 69.70 |
| Sodium oxide | 14.40 |
| Calcium oxide | 7.78 |
| Cerium oxide | 3.41 |
| Ferric oxide | 2.79 |
| Sodium sulphate | 0.83 |
| Sodium chloride | 0.83 |
| Nickel oxide | 0.26 |
| Selenium | 0.10 |

To this batch 3 parts of carbon may be added to give a proper control during the melting. The resultant glass will possess a visual transmission of approximately 16 per cent, a total energy transmission of approximately 4%, a curve somewhat similar to curve I and a warm rose smoke shade or color.

In certain of the examples quoted above, cobalt oxide is called for as a constituent of the glass batch in amounts ranging from one thousandth of a part by weight to one hundredth of a part by weight. The amount must be carefully controlled to give the warmth and color effect desired and it is to be particularly noted that, in addition to neutralizing effect in the yellow, the cobalt content contributes to the slight rise in transmission around 410 millimicrons, which is believed to greatly improve the glasses and render them particularly beneficial in preventing eye fatigue.

Other coloring agents can be used in place of cobalt while producing substantially similar or alternate results. For instance, Table F discloses a glass containing the light modifying agents, cerium oxide and nickel oxide. The nickel oxide has been found to contribute a little in the violet region of the curve while cerium oxide is particularly advantageous when added in the crude form since it inherently contains neodymium oxide which will introduce a sharp absorption in the yellow. These materials must be used only in carefully controlled amounts.

The several batches quoted above have not included cullet as one of the constituents. Of course, in any commercial procedure a certain proportion of cullet will generally be included along with the raw materials and, in fact, it has been found that glasses of the type taught by the invention can be produced from a batch consisting completely of cullet with the compensating addition of an appropriate amount of selenium and with the maintenance of the proper conditions during melting. If necessary or desired, controlled amounts of the above mentioned coloring ingredients may be included. Here again care must be taken so that too much gas will not be driven off and dissipate the selenium or that oxidizing conditions will be present to detrimentally affect the resultant selenium content thereof.

One might naturally assume that the superpositioning of a layer of selenium containing iron-free glass over a layer of infra-red absorbing iron-containing glass would accomplish the same transmission characteristics as the glass of the present invention. This, however, is not the case as will be apparent from inspection of curves VIII and IX, for example, wherein they would not jointly provide a curve similar to any one of curves I to VI. It is definitely known, however, that desirable results are obtained which differ from those resulting from the superpositioning of the two separate iron and selenium glass layers as mentioned above.

It is also particularly pointed out that the new glasses of the present invention provide a desired increase in the blue and violet transmission characteristics as compared with the prior green, iron-containing glasses. The selenium is not added in the glass of the present invention for bleaching purposes or for compensating for color introduced by impurities such as iron to render a "decolorized" glass since such uses of selenium are already well-known in the art. The selenium of the present invention is, however, added to a glass batch in which iron has been purposely included in appreciable amounts and production of the resultant glass carefully controlled. By following the disclosure herein, glasses having a total visible transmission of varying amounts may be obtained, which transmission in some instances may be as high as 67% for a thickness of approximately 2 millimeters which would be the upper limit of transmission of the Sunglass Institute specification. Any desired transmission can be obtained by increasing or decreasing the active coloring agents at the expense of the inactive glass base ingredients and this would extend from the upper limit desired for ophthalmic purposes to the lower limit desired for dense welding glasses.

The glass batch formulas, final analyses, transmission curves and percentages given above are by way of illustration only and should not be limitive of the invention except insofar as they are specifically recited in the appended claims.

From the foregoing, it will be seen that I have produced means and methods of a simple and efficient nature that will produce all the objects and advantages of the present invention.

Having described my invention, I claim:

1. A rose smoke light transmitting glass whose chemical analysis may be expressed by weight as consisting of from 65 to 75% silicon dioxide, from 11 to 19% of an alkali oxide selected from the group consisting of sodium oxide, potassium oxide and mixtures thereof, from 8 to 16% of calcium oxide and iron oxides combined, said iron oxides consisting of from 1½ to 5½% by weight of the glass, and from 0.001 to 0.2% of selenium, said iron oxides being in ferric form and ferrous form, with the portion in ferric form embodying at least one half of the iron oxides but less than the whole and with the portion in ferrous form constituting the balance of the iron oxides, said glass having such transmission characteristics for light radiations that when formed to a thickness which will provide transmission of approximately 13% at 550 millimicrons, it will provide transmission of from 12 to 18% at 720 millimicrons, from 16.5 to 20.5 percent at 680 millimicrons, from 18 to 21% at 625 millimicrons, from 17 to 18.5% at 580 millimicrons, from 8 to 9 per cent at 520 millimicrons, from 4 to 5% at 460 millimicrons, from 3 to 4% at 440 millimicrons and will produce a transmission at 420 millimicrons approximately 1% greater than at 440 millimicrons and transmitting less than 1% of all light radiations shorter than 380 millimicrons, said glass when approximately 2 millimeters thick having a total visual transmission of from approximately 14 to 56%, and a total energy transmission of from approximately 7 to 38%.

2. A glass for use in the manufacture of lenses, filters and the like having controlled infra-red and ultra-violet absorption characteristics and affording good visual delineation and a warm rose smoke shade or color to objects viewed therethrough, said glass consisting of silicon dioxide from approximately 65 to 75%, alkali oxide selected from the group consisting of sodium oxide, potassium oxide and mixtures thereof 11 to 19%, calcium oxide and iron oxides jointly from 8 to 16%, with the iron oxides thereof ranging from 1½% to 5½% of the glass, and selenium from .001 to .1%, with the iron oxides being in ferrous form and in ferric form, the part in ferric form embodying at least one half of the iron oxides but less than the whole and with the part in ferrous form constituting the balance, said part in ferrous form being sufficient to provide the glass with a total energy transmission between 7 and 38%, said glass having spectral transmission characteristics such that in the visible region of the spectrum its greatest transmission is in the yellow-orange-red region, with its transmission progressively decreasing to a relatively low transmission in the blue region, and thence increasing in the violet region, and with its transmission characteristics in the ultra-violet region outside the visible region being least.

3. An ultra-violet and infra-red absorbing glass having good visual delineation and a warm rose smoke shade or color, said glass comprising by chemical analysis the following approximate percentages by weight:

| | |
|---|---:|
| Silicon dioxide | 70.61 |
| Sodium oxide | 8.58 |
| Potassium oxide | 8.44 |
| Calcium oxide | 9.90 |
| Ferric oxide | 1.62 |
| Ferrous oxide | .288 |
| Selenium | .014 | and having a spectral transmission such that in the visible region of the spectrum its greatest transmission is in the yellow-orange-red region, with its transmission progressively decreasing to a relatively low transmission in the blue region, thence increasing as it leaves the visible region and again rapidly decreasing in the ultra-violet region to approximately zero and having a relatively low total energy transmission.

4. An ultra-violet and infra-red absorbing glass having good visual delineation and a warm rose smoke shade or color, said glass comprising by chemical analysis the following approximate percentages by weight:

| | |
|---|---:|
| Silicon dioxide | 71.69 |
| Sodium oxide | 15.22 |
| Potassium oxide | .15 |
| Calcium oxide | 7.94 |
| Ferric oxide | 3.46 |
| Ferrous oxide | .87 |
| Selenium | .017 | and having a spectral transmission such that in the visible region of the spectrum its greatest transmission is in the yellow-orange-red region, with its transmission progressively decreasing to a relatively low transmission in the blue region, thence increasing as it leaves the visible region and again rapidly decreasing in the ultra-violet region to approximately zero and having a relatively low total energy transmission.

5. A glass of the character described whose chemical analysis may be expressed by weight as consisting essentially of about 65 to 75% of silicon dioxide, about 11 to 19% of an alkali oxide selected from the group consisting of sodium oxide, potassium oxide and mixtures thereof, about 8 to 16% of calcium oxide and iron oxides combined, said iron oxides consisting of about 1½ to 5½% by weight of the glass, and about 0.001 to 0.2% of selenium, said iron oxides being in ferric form and ferrous form, with the portion in ferric form embodying at least one half of the iron oxides but less than the whole and with the portion in ferrous form constituting the balance of the iron oxides, and said glass having a spectral transmission such that in the visible region of the spectrum its greatest transmission is in the yellow-orange-red region, with its transmission progressively decreasing to a relatively low transmission in the blue region, thence increasing as it leaves the visible region and again rapidly decreasing in the ultra-violet region to nearly zero and having a relatively low total energy transmission.

6. A glass of the character described whose chemical analysis may be expressed by weight as consisting essentially of approximately 65 to 75% of silicon dioxide, approximately 11 to 19% of an alkali oxide selected from the group consisting of sodium oxide, potassium oxide and mixtures thereof, approximately 8 to 16% of calcium oxide and iron oxides combined, said iron oxides consisting of approximately 1½ to 5½% by weight of the glass, and approximately 0.001 to 0.2% of selenium, said iron oxides being in ferric form and ferrous form, with the portion in ferric form embodying at least one half of the iron oxides but less than the whole and with the portion in ferrous form constituting the balance of the iron oxides, said glass having such transmission characteristics for light radiations that when formed to a thickness which will provide transmission of approximately 13% at 550 millimicrons, it will provide transmission of from about 12 to about 18% at 720 millimicrons, from about 16.5 to about 20.5 percent at 680 millimicrons, from about 18 to about 21% at 625 millimicrons, from about 17 to about 18.5% at 590 millimicrons, from about 8 to about 9 percent at 520 millimicrons, from about 4 to about 5% at 460 millimicrons, from about 3 to about 4% at 440 millimicrons and will produce a transmission at 420 millimicrons slightly greater than at 440 millimicrons and transmitting less than 1% of all light radiations shorter than 380 millimicrons.

7. A glass of the character described whose chemical analysis may be expressed by weight as consisting essentially of approximately 65 to 75% of silicon dioxide, approximately 11 to 19% of an alkali oxide selected from the group consisting of sodium oxide, potassium oxide and mixtures thereof, approximately 8 to 16% of calcium oxide and iron oxides combined, said iron oxides consisting of approximately 1½ to 5½% by weight of the glass, and approximately 0.001 to 0.2% of selenium, said iron oxides being in ferric form and ferrous form, with the portion in ferric form embodying at least one half of the iron oxides but less than the whole and with the portion in ferrous form constituting the balance of the iron oxides, said glass having such transmission characteristics for light radiation that when formed to a thickness which will provide a transmission of approximately 13% at 550 millimicrons, it will provide transmission of approximately 3 to 4% at 440 millimicrons, 17.5 to 19.5% at 600 millimicrons and a substantially uninterrupted increase in percentage transmission for substantially each successive wavelength from 440 to 600 millimicrons, with its transmission at 420 millimicrons being slightly greater than at 440 millimicrons and its transmission in the ultraviolet region being least.

EDGAR D. TILLYER.

REFERENCES CITED

The following references are of record in the file of this patent:

UNITED STATES PATENTS

| Number | Name | Date |
|---|---|---|
| 1,995,952 | Taylor | Mar. 26, 1935 |
| 2,309,071 | Sullivan et al. | Jan. 19, 1943 |

FOREIGN PATENTS

| Number | Country | Date |
|---|---|---|
| 29,080 | Australia | 1931 |